US010112784B2

(12) United States Patent
Toto et al.

(10) Patent No.: US 10,112,784 B2
(45) Date of Patent: Oct. 30, 2018

(54) APPARATUS FOR VARYING THE PITCH BETWEEN MOVING ARTICLES

(71) Applicant: Fameccanica.Data S.p.A., Pescara (IT)

(72) Inventors: Marco Toto, Ripa Teatina (IT); Antonio Giansante, Spoltore (IT)

(73) Assignee: FAMECCANICA.DATA S.P.A., Pescara (IT)

( * ) Notice: Subject to any disclaimer, the term of this patent is extended or adjusted under 35 U.S.C. 154(b) by 0 days.

(21) Appl. No.: 15/829,343

(22) Filed: Dec. 1, 2017

(65) Prior Publication Data
US 2018/0170687 A1    Jun. 21, 2018

(30) Foreign Application Priority Data

Dec. 15, 2016   (IT) .................. 102016000127133
Mar. 15, 2017   (IT) .................. 102017000028519

(51) Int. Cl.
| | |
|---|---|
| *B65G 29/00* | (2006.01) |
| *B65G 47/32* | (2006.01) |
| *B65G 47/84* | (2006.01) |

(52) U.S. Cl.
CPC .......... *B65G 47/848* (2013.01); *B65G 47/32* (2013.01); *B65G 2201/02* (2013.01)

(58) Field of Classification Search
CPC ........ B65G 29/00; B65G 29/47; B65G 29/32; B65G 47/848
(Continued)

(56) References Cited

U.S. PATENT DOCUMENTS

| | | |
|---|---|---|
| 3,728,191 A | 4/1973 | Wierzba et al. |
| 4,483,351 A | 11/1984 | Seragnoli |
| | (Continued) | |

FOREIGN PATENT DOCUMENTS

| | | |
|---|---|---|
| EP | 1162162 A1 | 12/2001 |
| FR | 2496065 A1 | 6/1982 |
| | (Continued) | |

OTHER PUBLICATIONS

Search Report and Written Opinion for Italian Application No. 201600127133 dated Aug. 31, 2017.
(Continued)

*Primary Examiner* — Douglas A Hess
(74) *Attorney, Agent, or Firm* — Patterson & Sheridan, LLP

(57) ABSTRACT

An apparatus for varying the pitch between moving articles, comprising:
a stationary structure having a suction volume, a plurality of transport elements rotatable independently from each other about an axis and having respective gripping surfaces provided with suction holes, a rotary distributor rotatable about said axis independently of said transport elements, wherein the rotary distributor has a plurality of intake ducts having first openings selectively connected to said suction volume and second openings located on an interface surface of said rotary distributor, a plurality of rigid connection elements that establish a pneumatic connection between respective transport elements and said rotary distributor, wherein said rigid connection elements are fixed with respect to respective transport elements and have respective sliding surfaces in sliding contact with said interface surface.

12 Claims, 8 Drawing Sheets

(58) Field of Classification Search
USPC .............................. 198/471.1, 474.1, 476.1
See application file for complete search history.

(56) References Cited

U.S. PATENT DOCUMENTS

| | | | |
|---|---|---|---|
| 4,506,779 A | 3/1985 | Seragnoli | |
| 4,726,876 A | 2/1988 | Tomsovic, Jr. | |
| 4,880,102 A | 11/1989 | Indrebo | |
| 5,480,021 A | 1/1996 | Belvederi et al. | |
| 5,566,812 A * | 10/1996 | Irikura | A24C 5/475 |
| | | | 198/471.1 |
| 6,722,494 B2 * | 4/2004 | Nakakado | A61F 13/15764 |
| | | | 198/377.01 |
| 6,742,646 B2 * | 6/2004 | Sowden | A23G 3/04 |
| | | | 198/377.04 |
| 6,808,059 B2 * | 10/2004 | Nagai | A24C 5/327 |
| | | | 131/907 |
| 7,578,777 B2 * | 8/2009 | Draghetti | A24D 3/0287 |
| | | | 131/280 |
| 7,650,984 B2 * | 1/2010 | Giuliani | B65G 47/848 |
| | | | 198/459.8 |
| 7,922,638 B2 * | 4/2011 | Draghetti | A24C 5/326 |
| | | | 493/39 |
| 8,011,493 B2 * | 9/2011 | Giuliani | B65G 47/244 |
| | | | 198/406 |
| 8,651,853 B2 * | 2/2014 | Dupuis | B29C 49/421 |
| | | | 198/459.8 |
| 9,371,195 B2 * | 6/2016 | Papsdorf | B65G 29/00 |
| 9,452,600 B2 * | 9/2016 | Coates | B41F 17/002 |
| 9,452,898 B2 * | 9/2016 | Marti Sala | B65G 47/22 |
| 2008/0264761 A1 | 10/2008 | Giuliani et al. | |

FOREIGN PATENT DOCUMENTS

| | | |
|---|---|---|
| JP | 2010142414 A | 7/2010 |
| WO | 2007039800 A1 | 4/2007 |
| WO | 2014087293 A1 | 6/2014 |

OTHER PUBLICATIONS

Search Report dated Aug. 31, 2017 for Netherland Application No. 201600127133.

* cited by examiner

APPARATUS FOR VARYING THE PITCH BETWEEN MOVING ARTICLES

CROSS-REFERENCE TO RELATED APPLICATIONS

This application claims benefit of Italian patent application number 102016000127133, filed Dec. 15, 2016 and Italian patent application number 102017000028519, filed Mar. 15, 2017, which is herein incorporated by reference.

BACKGROUND OF THE INVENTION

Field of the Invention

The present invention relates to an apparatus for varying the pitch between moving articles. Apparatuses of this type are usually known as repitching apparatuses.

The invention has been developed, in particular, for application to machines for producing absorbent sanitary articles.

Description of Prior Art

The prior art relative to repitching apparatuses is quite extensive. For example, the document U.S. Pat. No. 4,880,102 discloses a device for transferring articles from a first conveyor on which articles advance with a first pitch to a second conveyor on which articles advance with a second pitch. The device comprises a plurality of transport elements rotatably mounted about an axis. During rotation about said axis, the transport elements pick up the articles from the first conveyor and transfer them to the second conveyor. During transfer, the speed of the transport elements is varied between a pick-up position and a release position.

Essentially similar solutions are disclosed in other documents, for example, U.S. Pat. No. 5,480,021, U.S. Pat. No. 4,506,779, U.S. Pat. No. 4,726,876.

In other embodiments, such as those described in documents U.S. Pat. No. 3,728,191 and U.S. Pat. No. 4,483,351, it is also possible to perform, together with the variation of the pitch, a variation of the orientation of the articles between the pick-up position and the release position, with an operation called "turn and repitch".

The repitch apparatuses must be able to stably retain the articles on the transport elements during transfer from the gripping position to the release position, and to stop the retaining action of the articles in the release position. This is usually obtained by means of a vacuum grip system for connecting the gripping surfaces of the transport elements to a sub-atmospheric pressure source in the path between the gripping position and the release position, and interrupting the connection with the sub-atmospheric pressure source when the gripping elements are in the release position of the articles. Usually, the vacuum gripping means provided on the transport elements must be switched on at a moment before gripping of the articles, remain active to retain the articles on the gripping surfaces during the path of approaching the release area of the articles, and to deactivate at a moment before release of the articles.

The document US-A-2008/0264761 discloses a repitching device provided with sub-atmospheric pressure distribution members at the transport elements, which allow the transport elements to selectively carry out a suction action for gripping the articles. The vacuum gripping means include a rotary distributor and a plurality of flexible tubes arranged between the rotary distributor and each transport element. The flexible tubes allow angular displacements between the transport elements and the distributor due to the cyclic speed variation of the transport elements between the gripping and release positions. The speed variations between the transport elements and the rotary distributor result in cyclic deformations of the flexible tubes, which over time cause breakage of the flexible tubes due to fatigue. The main disadvantage of repitching apparatuses fitted with flexible tubes connecting the transport elements to the rotary distributor is the need for frequent maintenance operations to replace the flexible tubes.

SUMMARY OF THE INVENTION

The object of the present invention is to provide a repitching apparatus that overcomes the problems of the prior art.

According to the present invention, this object is achieved by an apparatus for varying the pitch between moving articles, comprising:

a stationary structure having a suction volume;

a plurality of transport elements rotatable independently from each other about an axis and having respective gripping surfaces provided with suction holes;

a rotary distributor rotatable about said axis independently of said transport elements, and having a plurality of intake ducts comprising first openings selectively connected to said suction volume and second openings located on an interface surface of said rotary distributor; and a plurality of rigid connection elements that establish a pneumatic connection between respective transport elements and said rotary distributor, wherein said rigid connection elements are fixed with respect to respective transport elements and have respective sliding surfaces in sliding contact with said interface surface, wherein said rigid connection elements have respective suction chambers elongated in the circumferential direction and open on said sliding surfaces, wherein said suction chambers are pneumatically connected to said suction holes of the respective transport elements and are connected pneumatically to said respective second openings of said rotary distributor.

The claims form an integral part of the disclosure provided here in relation to the invention.

BRIEF DESCRIPTION OF THE DRAWINGS

The present invention will now be described in detail with reference to the attached drawings, given purely by way of non-limiting example, wherein.

It can be appreciated that, for clarity and simplicity of illustration, the various figures may not be reproduced in the same scale, and in some of the figures, a number of components have not been illustrated for a better understanding of the figures.

DETAILED DESCRIPTION

Figure 1:
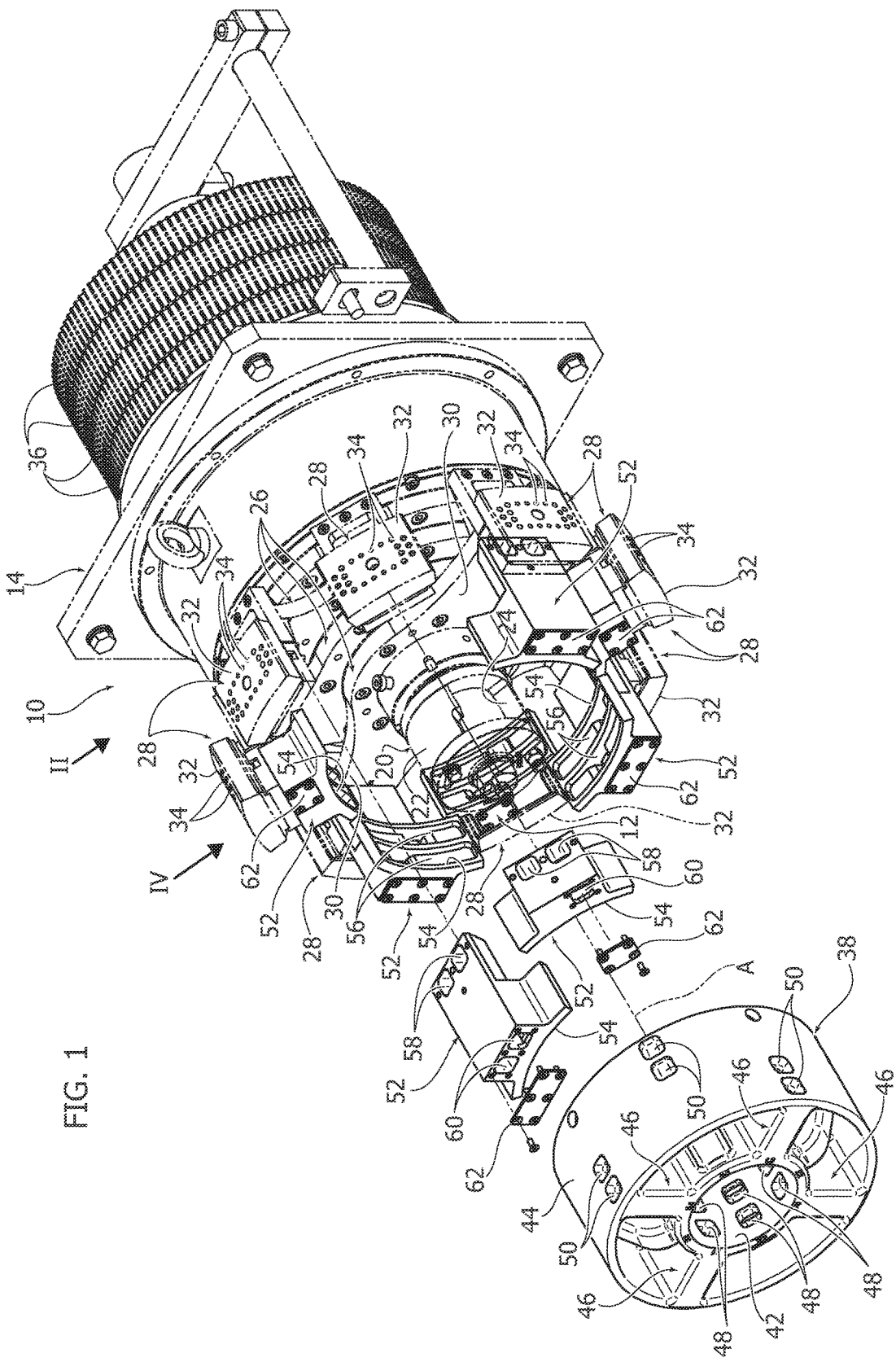
FIG. 1 is a partially exploded perspective view of a repitching apparatus according to an embodiment of the present invention.
Figure 2:
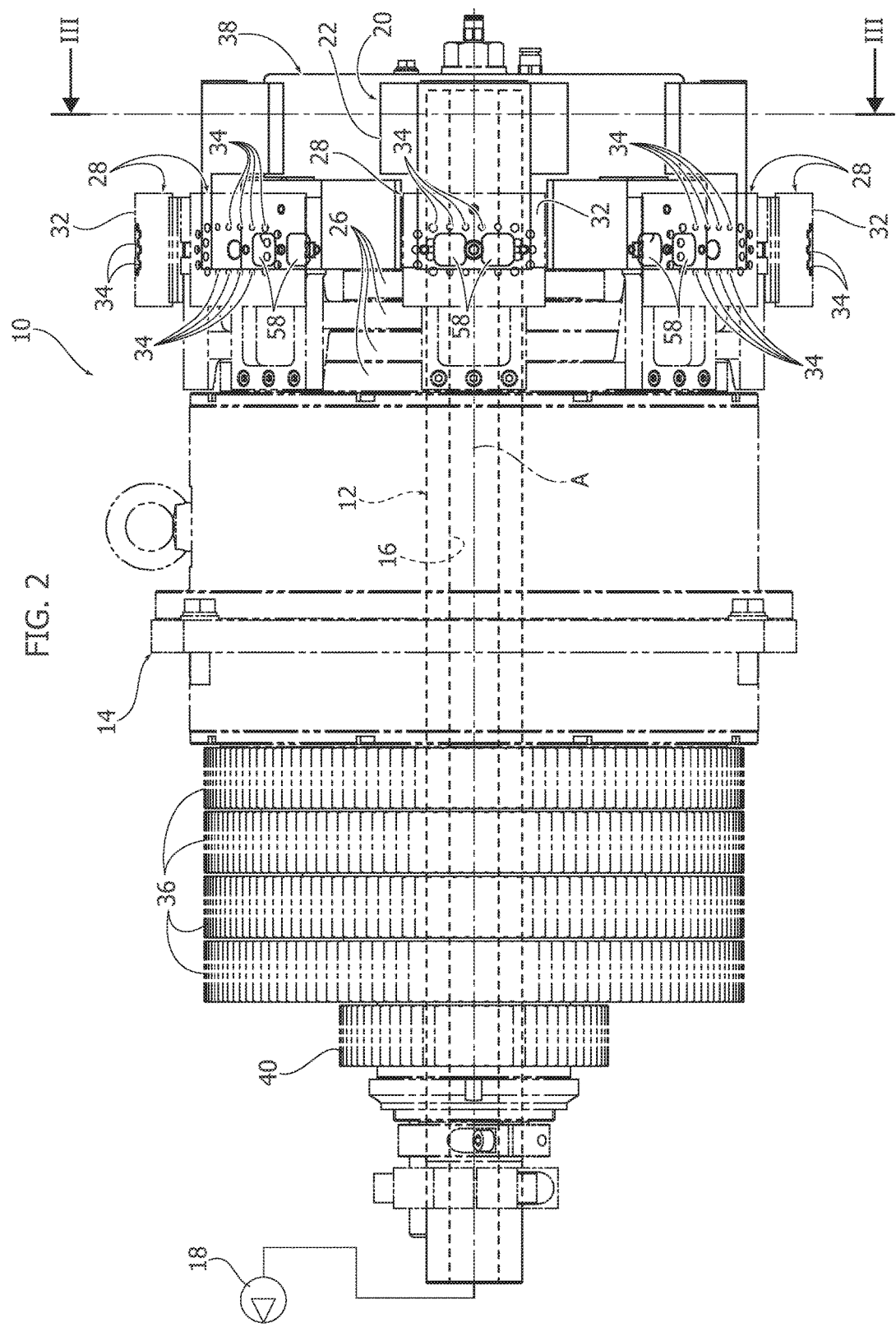
FIG. 2 is a side view according to the arrow II of FIG. 1.
Figure 3:
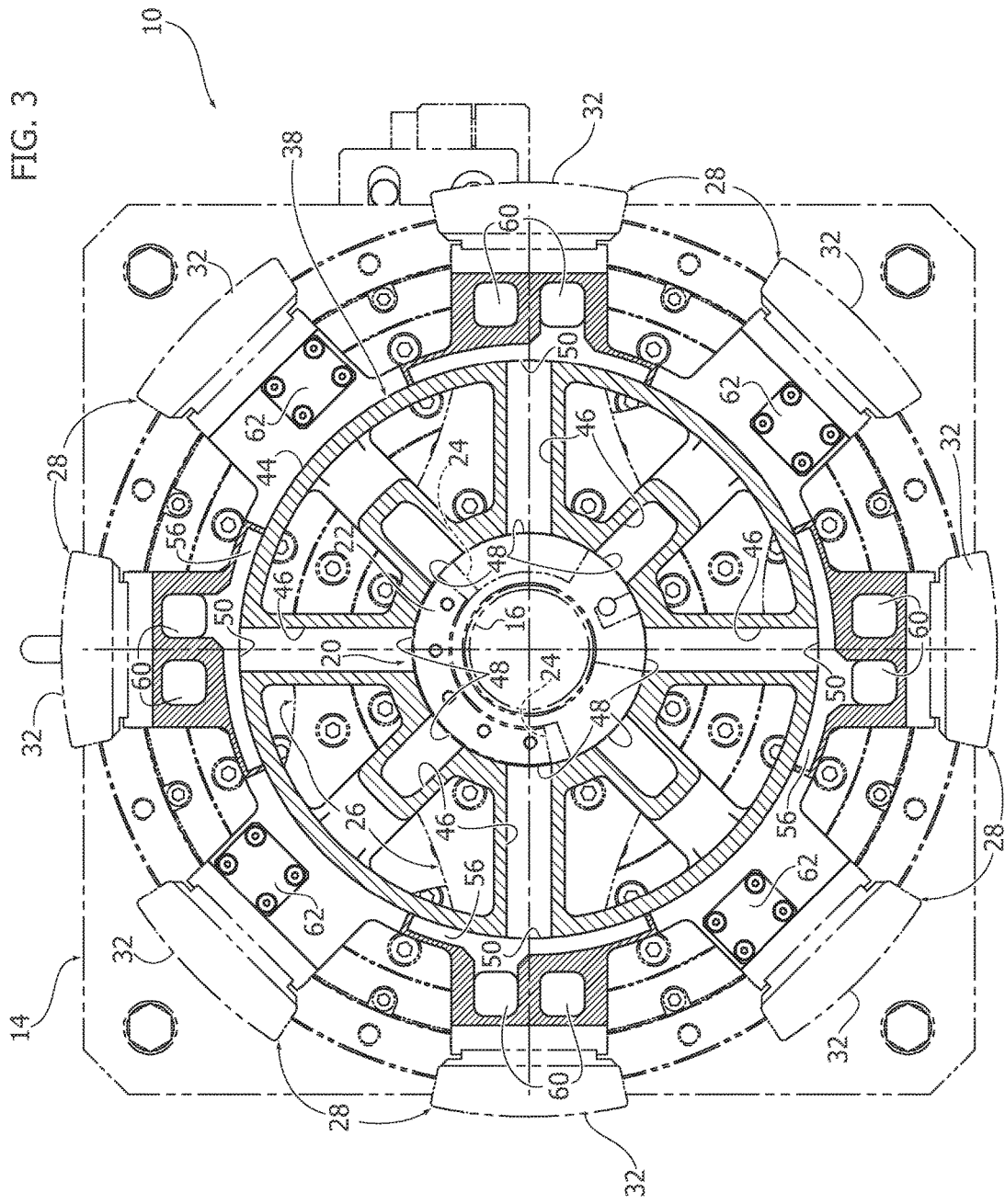
FIG. 3 is a cross-section along the line III-Ill of FIG. 2.

Referring to the figures, numeral 10 indicates an apparatus for varying the pitch between moving articles, or a repitching apparatus. The apparatus 10 comprises a stationary structure including a fixed central shaft 12 and an outer flange 14. With reference to FIG. 2, the fixed central shaft 12 has an inner cavity defining a suction volume 16 connected to a vacuum source schematically indicated with 18. A fixed distributor 20 is mounted at one end of the fixed shaft 12, having an outer cylindrical surface 22 on which openings 24 are formed in communication with the suction volume 16.

The repitching apparatus 10 comprises a plurality of rotors 26 independently rotatable about an axis A coincident with the longitudinal axis of the fixed central shaft 12. Each rotor 26 carries at least one transport element 28. The transport elements 28 rotate about the axis A at variable speeds, and are capable of picking up articles advancing on a first conveyor with a first pitch, and depositing them on a second conveyor with a second pitch that is different from the first.

The transport elements 28 have respective gripping surfaces 32 provided with suction holes 34. The transport elements 28 are configured to pick up articles in a pick-up position and to retain them, by suction, on the gripping surfaces 32 during the journey from the pick-up position to the release position. The speed variation of the transport elements 28 between the pick-up position and the release position determines the pitch variation between the articles, also known as the repitch operation. The transport elements 28 can be rotatable about respective radial axes so as to vary the orientation of the articles between the gripping position and the release position, to carry out an operation known as "turn and repitch".

The transport elements 28 are connected to respective actuating members 36 that drive the rotors 26 about the axis A. The actuating members 36 can be gears, connected, for example, by means of toothed belts, to respective electronically-controlled electric motors.

Each rotor 26 can comprise two radial arms 30 opposite to each other, fixed to the respective shaft 64 and carrying two transport elements 28 at their distal ends. Alternatively, as illustrated in the embodiments of FIGS. 5-8, each rotor 26 can carry a single transport element 28 fixed to the end of a radial arm 30. In this case, each rotor 26 can comprise a counterweight 31 opposite to the transport element 28 with respect to the rotation axis A.

As illustrated in FIGS. 5-8, each rotor 26 comprises a shaft 64 that connects the respective transport element 28 to the respective actuating member 36. The shafts 64 of the various rotors 26 are coaxial to each other about the axis A. The shaft 64 of each rotor is rotatably supported about the axis A by respective bearings 66. The bearings 66 can be arranged between two shafts 64 of two rotors 26 or can be arranged between the shaft 64 of a rotor 26 and the fixed central shaft 12.

Each rotor 26 is rotated about the axis A by a respective electronically-controlled electric motor. An electronic control unit controls the electric motors so as to impart the preset motion laws to the rotors 26 to vary the speed of the transport elements 28 between the gripping position and the release position, so as to obtain the required pitch variation.

The repitching apparatus 10 comprises a rotary distributor 38 rotatably mounted on the fixed distributor 20 about the axis A. The rotary distributor 38 is connected to a respective actuating member 40 (FIG. 2), driven by a respective electric motor. The rotary distributor 38 is rotatably driven about the axis A independently of the rotors 26. The rotary distributor 38 can be rotated at a constant speed, for example, equal to the average speed of the rotors 26.

The rotary distributor 38 has an inner cylindrical surface 42 in contact with the outer cylindrical surface 22 of the fixed distributor 20. The rotary distributor 38 has an interface surface 44 formed of a cylindrical surface coaxial to the axis A. The rotary distributor 38 has a plurality of intake ducts 46 extending between the interface surface 44 and the inner surface 42. The intake ducts 46 have first openings 48 open on the inner cylindrical surface 42 and second openings 50 open on the interface surface 44. During rotation of the rotary distributor 38 about the axis A, the first openings 48 cyclically face the openings 24 of the fixed distributor 20, so that the intake ducts 46 are selectively connected to the suction volume 16.

The repitching apparatus 10 comprises a plurality of rigid connection elements 52, which establish a pneumatic connection between respective transport elements 28 and the rotary distributor 38. The rigid connection elements 52 can be made of metal, for example, aluminum or its alloys, or plastic material, preferably self-lubricating plastic material such as PTFE. The rigid connection elements 52 are fixed to respective transport elements 28. The rigid connection elements 52 have respective cylindrical sliding surfaces 54 in sliding contact with the interface surface 44 of the rotary distributor 38. The rigid connection elements 52 are provided with respective suction chambers 56 open on the sliding surfaces 54. The suction chambers 56 of the rigid connection elements 52 face respective second openings 50 of the rotary distributor 38.

The suction chambers 56 can be elongated in the circumferential direction and can have an angular extension in the circumferential direction that is equal to or greater than the maximum angular range between the transport elements 28 and the rotary distributor 38, in order to maintain the suction chambers 56 of the rigid connection elements 52 constantly connected pneumatically to the respective second openings 50 of the rotary distributor 38 in any relative angular position between the rigid connection elements 52 and the rotary distributor 38.

The rigid connection elements 52 comprise respective openings 58 pneumatically connected to the suction holes 34 of the respective transport elements 28, for example, by means of chambers or ducts formed within the transport elements 28 which, for simplicity, are not represented in the attached figures. The suction chambers 56 of each rigid connection element 52 are connected to the respective openings 58 by means of channels 60. For constructive reasons, the channels 60 can be opened on a front surface of the rigid connection elements 52. In this case, the front openings of the channels 60 can be closed by means of plates 62.

Adjacent rigid connection elements 52 can be offset from each other in the direction of the longitudinal axis A to avoid interference between adjacent rigid connection elements 52 during movement at different speeds about the axis A.

With reference to FIGS. 5-8, in one or more embodiments, each transport element 28 can comprise a longitudinal beam 68 and a shoe 70 fixed, for example, by means of screws 72, on the outside of the beam 78. Each shoe 70 has a gripping surface 32 provided with suction holes 34. The suction holes 34 of the shoe 70 are in pneumatic communication with the suction chambers 56 of the respective rigid connection element 52. Each rigid connection member 52 is fixed, for example, by means of screws 74, on the inner side of the longitudinal beam 68 of the respective transport element 28.

In one or more embodiments, the transport elements 28 are supported by opposite sides of the respective rigid connection elements 52.

In one or more embodiments, the side of the transport elements 28 facing towards the actuating members 36 is supported by a respective radial arm 30. With reference to FIGS. 5-8, the longitudinal beam 68 of the respective transport element 28 is fixed, for example, by means of screws 76, to the distal end of the respective radial arm 30.

Figure 5:
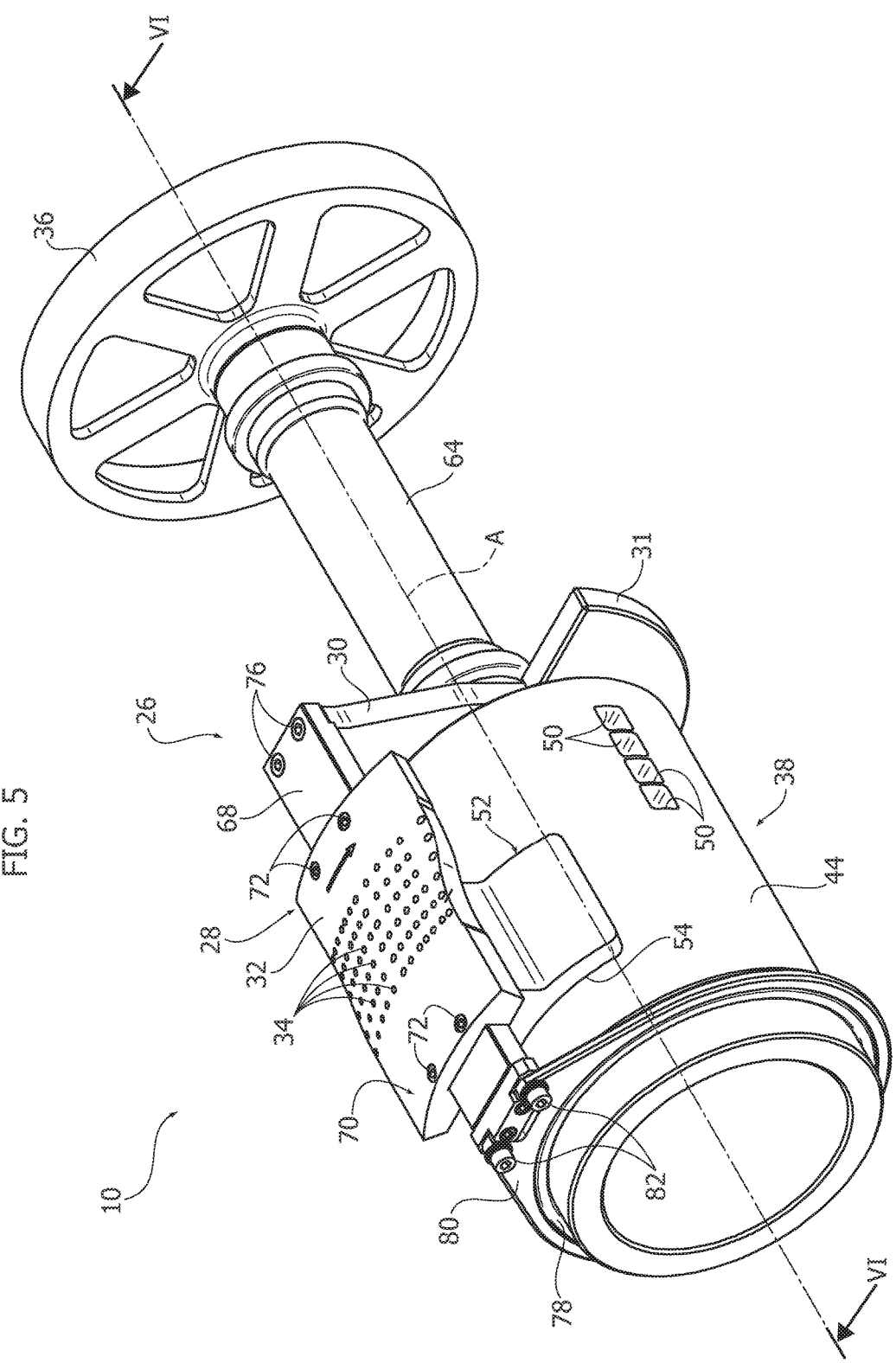
FIG. 5 is a perspective view illustrating some components of a repitching apparatus according to another embodiment of the present invention.
Figure 6:
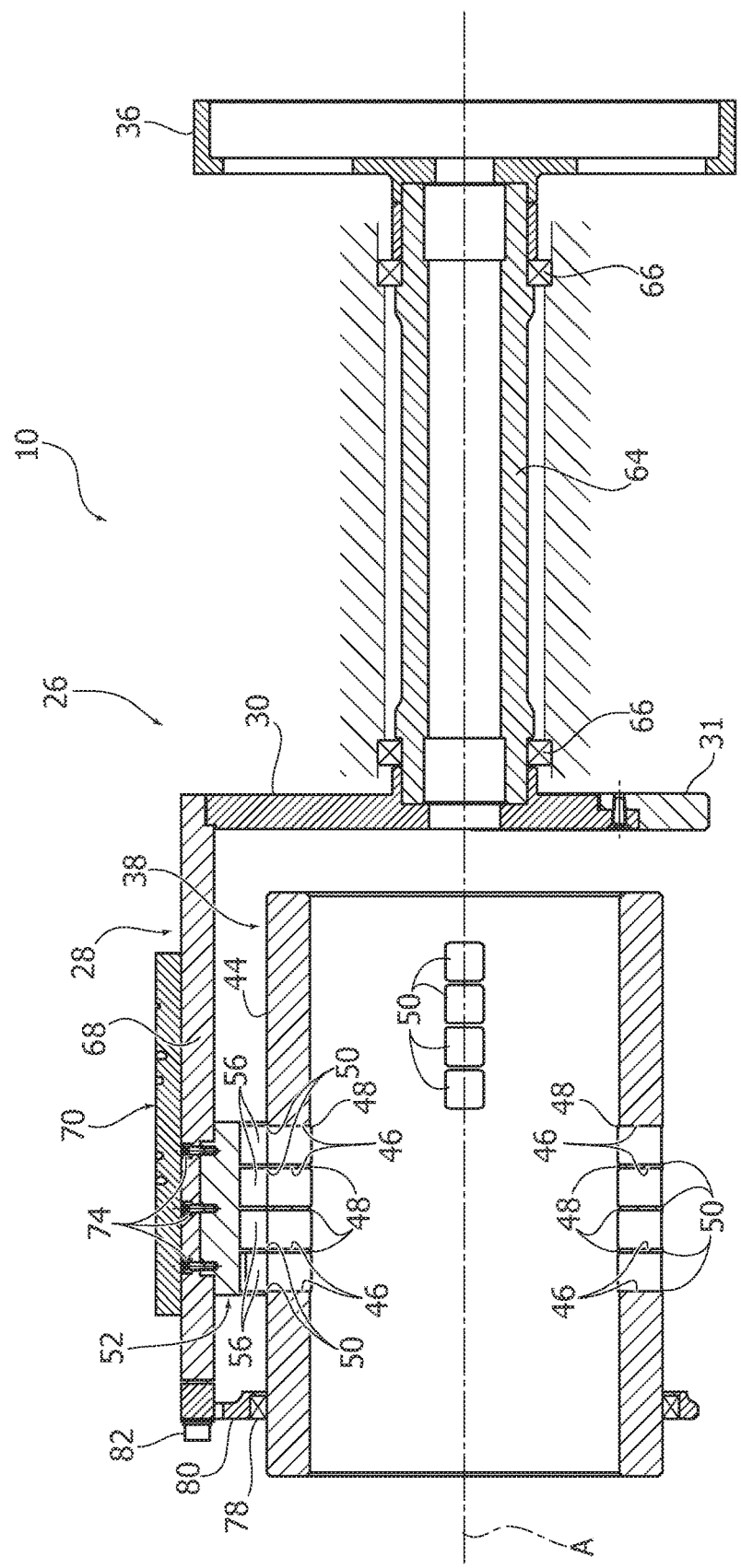
FIG. 6 is a cross-section along the line VI-VI of FIG. 5.

With reference to FIGS. 5 and 6, in one or more embodiments, the side of the transport elements 28 opposite to the actuating members 36 is supported by a respective bearing 78. In one or more embodiments, the end of the longitudinal beam 68 opposite to the actuating members 36 is fixed to a crown 80, for example, by means of screws 82, and the bearing 78 is arranged between the crown 82 and the rotary distributor 38.

Figure 7:
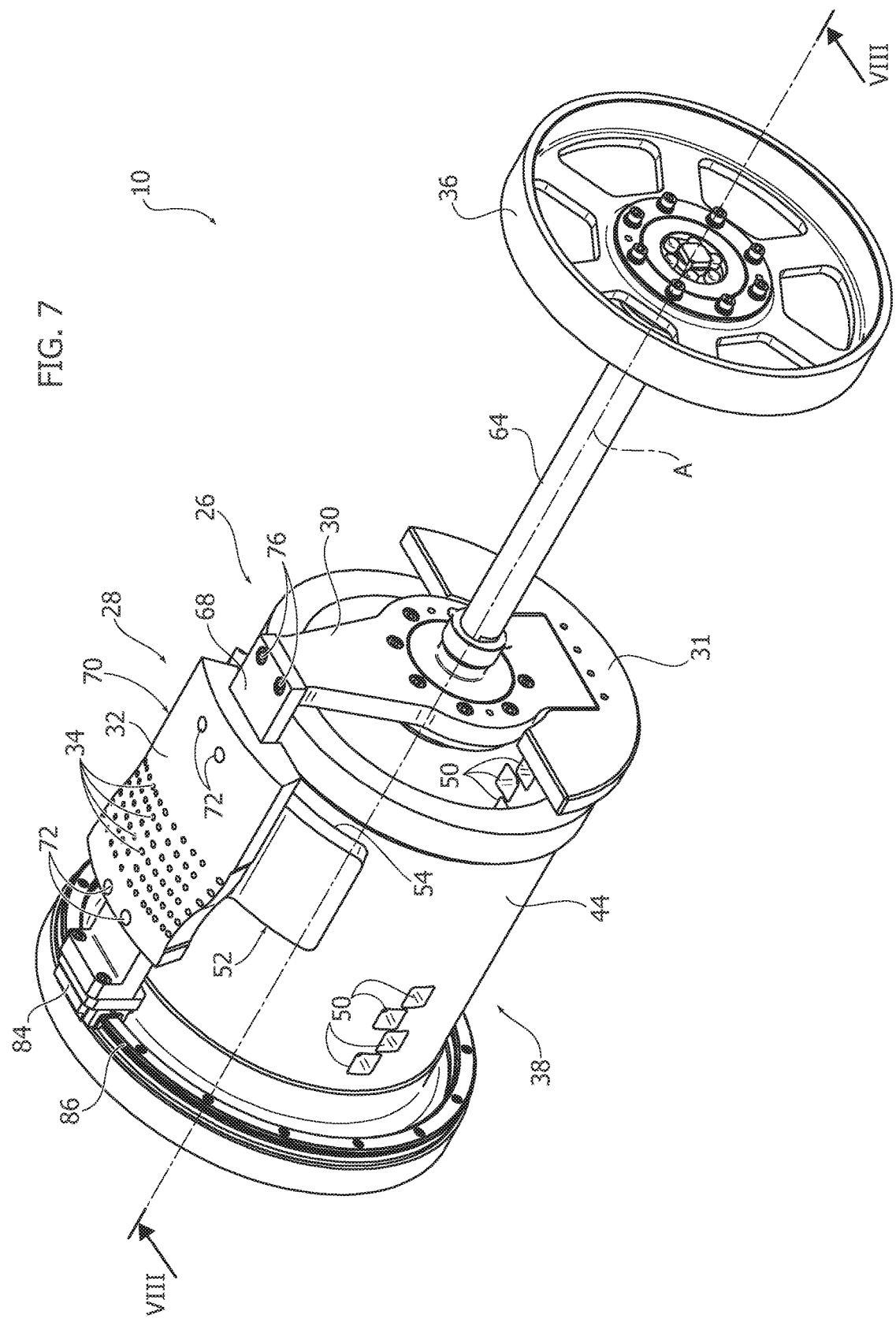
FIG. 7 is a perspective view illustrating some components of a repitching apparatus according to another embodiment of the present invention.
Figure 8:
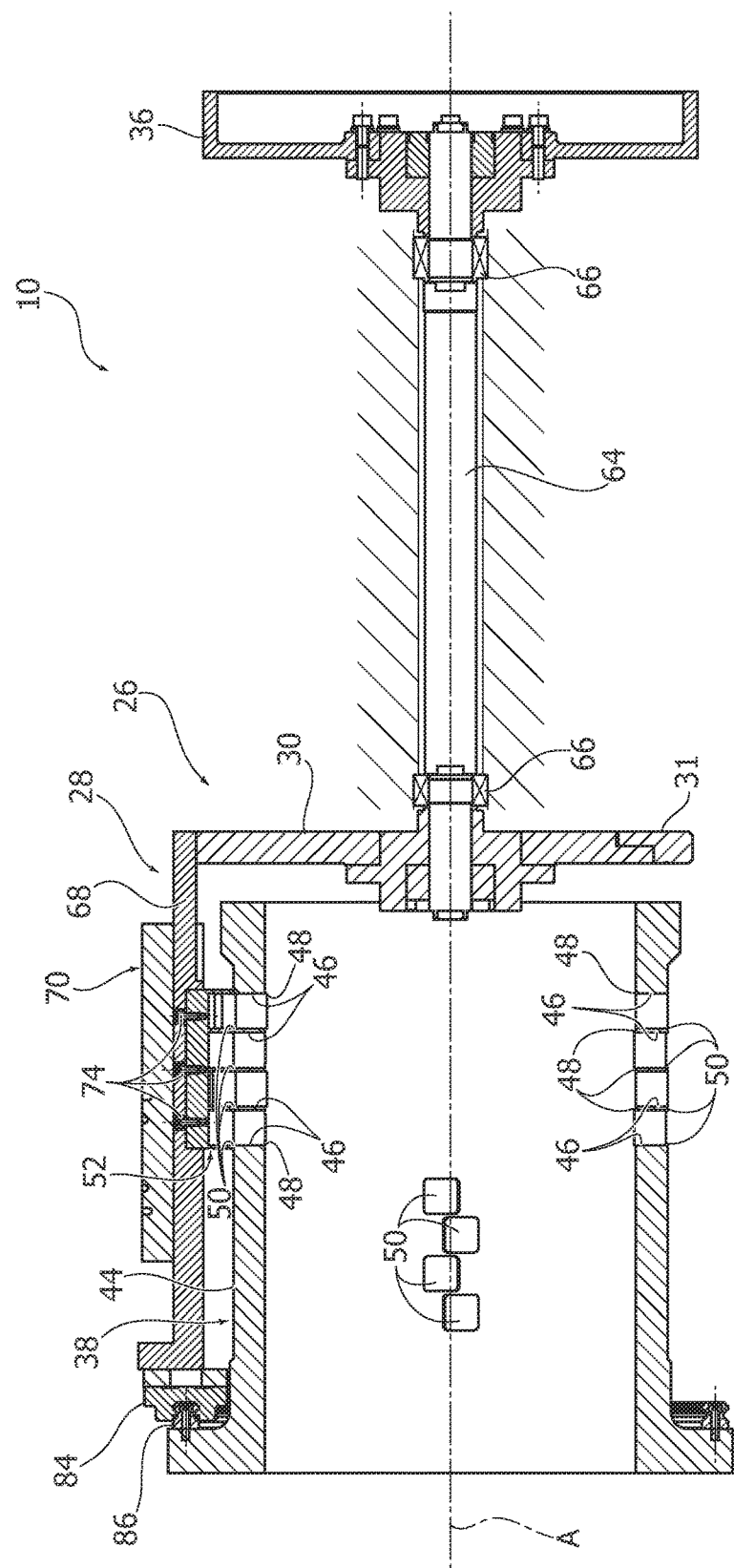
FIG. 8 is a cross-section along the line VIII-VIII of FIG. 5.

With reference to FIGS. 7 and 8, in one or more embodiments, the side of the transport elements 28 opposite to the actuating members 36 is supported by a respective shoe 84 that slidably engages a circular guide 86 coaxial with axis A and fixed to the rotary distributor 38. The shoe 84 is fixed to the end of the longitudinal beam 68 opposite to the actuating members 36.

The fact of supporting the transport elements 28 on opposite sides of the respective rigid connection elements 52 helps to keep the sliding surfaces 54 of the rigid connection elements 52 in a required position with respect to the interface surface 44, for example, with a predetermined and constant clearance between the sliding surfaces 54 and the interface surface 44.

Figure 4:
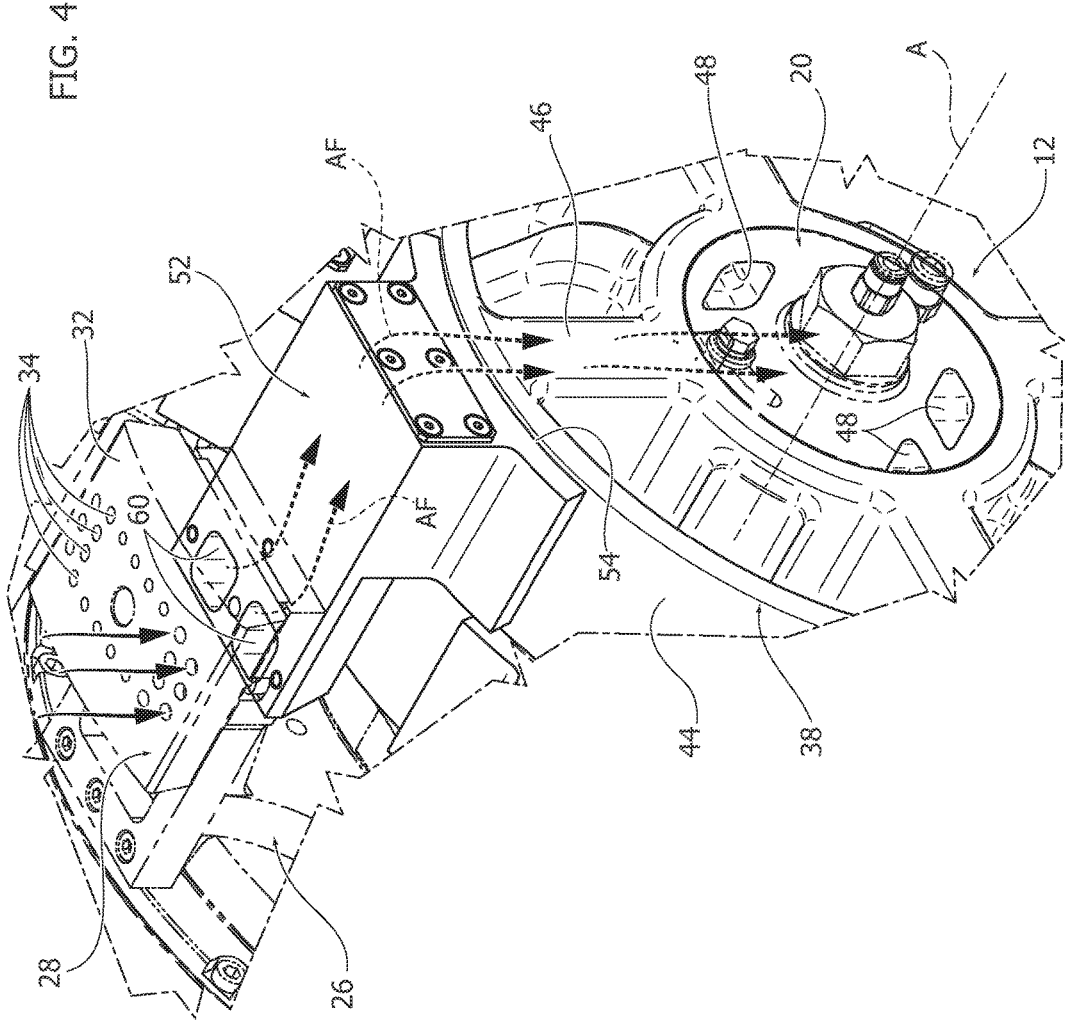
FIG. 4 is an enlarged detail of the part indicated by the arrow IV in FIG. 1.

With reference to FIG. 4, during operation, the gripping surfaces of the individual transport elements 28 are selectively pneumatically connected to the stationary suction volume 16 through a pneumatic path extending through:

the suction holes 34;

the openings 58, the channels 60 and the suction chambers 56 of the rigid connection elements 52;

the second openings 50, the suction channels 46 and the first openings 48 of the rotary distributor 38; and the openings 24 of the fixed distributor 20. In FIG. 4, the arrows AF indicate the airflow path from the gripping surfaces 32 to the suction volume 16.

The pneumatic connection between the gripping surfaces 32 and the stationary suction volume 16 is selectively activated and interrupted according to the relative position between the rotary distributor 38 and the fixed distributor 20. The pneumatic path of each transport element 28 is activated at a moment before the transport element 28 reaches the pick-up position and is kept active during the journey from the pick-up position to the release position. The pneumatic connection is interrupted at a moment before the transport element 28 reaches the release position.

During operation, the transport elements 28 are rotated about the axis A, with a variable speed, between the pick-up position and the release position to vary the pitch between the moving articles. The speed variation of the transport elements 28 between the gripping position and the release position of the articles involves a slipping between the rigid connection elements 52 and the rotary distributor 38 that rotates at a constant speed. The slipping between the rigid connection elements 52 and the rotary distributor 38 never interrupts the pneumatic path between the rigid connection elements 52 and the rotary distributor 38, in whatever relative position they assume, because the suction chambers 56 of the rigid connection elements 52 are elongated in the circumferential direction and open on the sliding surfaces 54, so as to always maintain pneumatic contact with the respective second openings 50 of the rotary distributor 38.

The solution according to the present invention avoids the use of flexible tubes for connection between the rotary distributor 38 and the transport elements 28 and, consequently, avoids the maintenance operations for periodic replacement of the flexible tubes subjected to breakage due to fatigue stress.

Of course, without prejudice to the principle of the invention, the details of construction and the embodiments can be widely varied with respect to those described and illustrated, without thereby departing from the scope of the invention as defined by the claims that follow.

The invention claimed is:

1. An apparatus for varying the pitch between moving articles, comprising:

a stationary structure having a suction volume;

a plurality of rotors rotatable independently from each other about a common axis, each rotor having at least one transport element and each transport element having respective gripping surfaces provided with suction holes;

a rotary distributor rotatable about said axis independently of said rotors, and having a plurality of intake ducts comprising first openings selectively connected to said suction volume and second openings located on an interface surface of said rotary distributor; and a plurality of rigid connection elements that establish a pneumatic connection between respective transport elements and said rotary distributor, wherein said rigid connection elements are fixed with respect to respective transport elements and have respective sliding surfaces in sliding contact with said interface surface, wherein said rigid connection elements have respective suction chambers elongated in the circumferential direction and open on said sliding surfaces, wherein said suction chambers are pneumatically connected to said suction holes of the respective transport elements and are connected pneumatically to said respective second openings of said rotary distributor.

2. An apparatus according to claim 1, wherein said suction chambers have an angular extension in said circumferential direction that is equal to or greater than the maximum angular range between said rigid connection elements and said rotary distributor.

3. An apparatus according to claim 1, wherein adjacent rigid connection elements are mutually offset in the direction of said axis.

4. An apparatus according to claim 1, wherein each of said rigid connection elements has at least one opening pneumatically connected to said suction holes of a respective transport element and connected to the respective suction chamber by means of at least one channel.

5. An apparatus according to claim 1, wherein said transport elements are supported on opposite sides of the respective rigid connection elements.

6. An apparatus according to claim 5, wherein said transport elements are connected to respective actuating members by means of respective shafts coaxial to said axis, and wherein sides of said transport elements facing towards said actuating members are supported by respective radial arms fixed to respective shafts.

7. An apparatus according to claim 6, wherein said transport elements are supported by respective bearings on respective sides opposite to said actuating members.

8. An apparatus according to claim 7, wherein said transport elements are fixed to respective crowns, and wherein respective bearings are arranged between said crowns and the rotary distributor.

9. An apparatus according to claim 6, wherein said transport elements on respective sides opposite to said actuating members are supported by respective shoes, which slidably engage a circular guide coaxial to said axis (A) and fixed to the rotary distributor.

10. An apparatus according to claim 1, wherein said transport elements comprise respective longitudinal beams and respective shoes fixed on outer sides of respective beams, and wherein respective rigid connection elements are fixed on inner sides of said longitudinal beams.

11. An apparatus for varying the pitch between moving articles, comprising:
    a stationary structure having a suction volume;
    a plurality of transport elements rotatable independently from each other about an axis and having respective gripping surfaces provided with suction holes;
    a rotary distributor rotatable about said axis independently of said transport elements, and having a plurality of intake ducts comprising first openings selectively connected to said suction volume and second openings located on an interface surface of said rotary distributor; and
    a plurality of rigid connection elements that establish a pneumatic connection between respective transport elements and said rotary distributor, wherein said rigid connection elements are fixed with respect to respective transport elements and have respective sliding surfaces in sliding contact with said interface surface, wherein said rigid connection elements have respective suction chambers elongated in the circumferential direction and open on said sliding surfaces, wherein said suction chambers are pneumatically connected to said suction holes of the respective transport elements and are connected pneumatically to said respective second openings of said rotary distributor, wherein said suction chambers have an angular extension in said circumferential direction that is equal to or greater than the maximum angular range between said rigid connection elements and said rotary distributor.

12. An apparatus for varying the pitch between moving articles, comprising:
    a stationary structure having a suction volume;
    a plurality of transport elements rotatable independently from each other about an axis and having respective gripping surfaces provided with suction holes;
    a rotary distributor rotatable about said axis independently of said transport elements, and having a plurality of intake ducts comprising first openings selectively connected to said suction volume and second openings located on an interface surface of said rotary distributor; and
    a plurality of rigid connection elements that establish a pneumatic connection between respective transport elements and said rotary distributor, wherein said rigid connection elements are fixed with respect to respective transport elements and have respective sliding surfaces in sliding contact with said interface surface, wherein said rigid connection elements have respective suction chambers elongated in the circumferential direction and open on said sliding surfaces, wherein said suction chambers are pneumatically connected to said suction holes of the respective transport elements and are connected pneumatically to said respective second openings of said rotary distributor, wherein adjacent rigid connection elements are mutually offset in the direction of said axis.

* * * * *